US009851082B2

(12) United States Patent
Thompson et al.

(10) Patent No.: US 9,851,082 B2
(45) Date of Patent: Dec. 26, 2017

(54) LIGHTING DEVICE (71) Applicant: Jack Sealey Limited, Bury St Edmunds, Suffolk (GB)

(72) Inventors: Tim Thompson, Colchester (GB); Jess I'Anson, Colchester (GB); Bao Yong, Linshan Town (CN)

(73) Assignee: Jack Sealey Limited, Burry St Edmunds, Suffolk (GB)

( * ) Notice: Subject to any disclaimer, the term of this patent is extended or adjusted under 35 U.S.C. 154(b) by 6 days.

(21) Appl. No.: 14/401,221

(22) PCT Filed: May 14, 2013

(86) PCT No.: PCT/GB2013/051234
§ 371 (c)(1),
(2) Date: Nov. 14, 2014

(87) PCT Pub. No.: WO2013/171471
PCT Pub. Date: Nov. 21, 2013

(65) Prior Publication Data
US 2015/0131276 A1      May 14, 2015

(30) Foreign Application Priority Data

May 18, 2012 (GB) .................................. 1208798.7
Feb. 27, 2013 (GB) .................................. 1303503.5

(51) Int. Cl.
*F21L 4/00* (2006.01)
*F21V 21/30* (2006.01)
(Continued)

(52) U.S. Cl.
CPC ........... *F21V 21/30* (2013.01); *F16M 11/046* (2013.01); *F16M 11/14* (2013.01); *F21L 4/025* (2013.01);
(Continued)

(58) Field of Classification Search
CPC .. F21V 21/096; F21V 21/0965; F21V 21/145; F21V 21/29; F21V 21/26;
(Continued)

(56) References Cited

U.S. PATENT DOCUMENTS 4,533,982 A * 8/1985 Kozar ....................... F21L 4/04
362/183
5,077,644 A * 12/1991 Schaller .................. F21L 4/022
362/184

(Continued)

FOREIGN PATENT DOCUMENTS

GB          291547      6/1928
JP     2006-190661 A    7/2006

OTHER PUBLICATIONS

International Search Report dated Jul. 12, 2013, issued in PCT Application No. PCT/GB2013/051234, filed May 14, 2013.

*Primary Examiner* — William N Harris
(74) *Attorney, Agent, or Firm* — Workman Nydegger (57) ABSTRACT

A lamp (10) constructed as a hand lamp and for static use. The lamp includes a lamp housing (12), a light source in the lamp housing, a lamp mounting (14) for mounting the lamp in a desired position on a surface and a universal joint (24, 26) coupling the lamp housing and the mounting together, whereby the lamp housing is universally adjustable in attitude relative to the mounting.

13 Claims, 14 Drawing Sheets

(51) Int. Cl.
*F21L 4/02* (2006.01)
*F21L 4/04* (2006.01)
*F21L 14/02* (2006.01)
*F21V 21/096* (2006.01)
*F21V 21/14* (2006.01)
*F16M 11/04* (2006.01)
*F16M 11/14* (2006.01)
*F21V 21/06* (2006.01)
*F21V 21/08* (2006.01)
*F21V 21/29* (2006.01)
*F21Y 103/10* (2016.01)
*F21Y 115/10* (2016.01)
*F21Y 113/20* (2016.01)
*F21V 23/04* (2006.01)

(52) U.S. Cl.
CPC ............ *F21L 4/027* (2013.01); *F21L 4/04* (2013.01); *F21L 14/023* (2013.01); *F21L 14/026* (2013.01); *F21V 21/096* (2013.01); *F21V 21/0965* (2013.01); *F21V 21/145* (2013.01); *F16M 2200/022* (2013.01); *F16M 2200/027* (2013.01); *F16M 2200/028* (2013.01); *F21V 21/06* (2013.01); *F21V 21/08* (2013.01); *F21V 21/29* (2013.01); *F21V 23/0414* (2013.01); *F21Y 2103/10* (2016.08); *F21Y 2113/20* (2016.08); *F21Y 2115/10* (2016.08)

(58) Field of Classification Search
CPC ..... F21V 21/28; F21L 4/02; F21L 4/04; F21L 4/045; F21L 4/022
USPC .......................................... 362/191, 197, 421
See application file for complete search history.

(56) References Cited

U.S. PATENT DOCUMENTS

| | | | |
|---|---|---|---|
| 6,315,426 B1* | 11/2001 | Buller, Jr. | A45F 3/14 362/103 |
| 6,352,227 B1* | 3/2002 | Hathaway | F16M 11/14 248/160 |
| 6,986,590 B1 | 1/2006 | Padden | |
| 7,217,013 B2* | 5/2007 | Endo | F16M 11/06 362/190 |
| 7,896,520 B1* | 3/2011 | Norling | A47J 37/0786 362/191 |
| 9,539,952 B2* | 1/2017 | Gebhard | F21V 21/30 |
| 2002/0191396 A1* | 12/2002 | Reiff | F21L 4/04 362/246 |
| 2005/0201085 A1 | 9/2005 | Aikawa et al. | |
| 2006/0028812 A1* | 2/2006 | Yuen | F21L 4/02 362/184 |
| 2010/0053944 A1 | 3/2010 | Yao-Lin | |
| 2010/0182777 A1 | 7/2010 | Van Deursen | |
| 2011/0255274 A1* | 10/2011 | Coleman | F21L 4/02 362/183 |

* cited by examiner

LIGHTING DEVICE

FIELD OF THE INVENTION

This invention relates to a lighting device, and more particularly to a lamp constructed as a hand lamp and for static use. Particularly, but not exclusively, the invention relates to inspection lamps, e.g. as commonly used by mechanics when working on or otherwise inspecting motor vehicles.

BACKGROUND TO THE INVENTION

Lighting devices such as torches and inspection lamps are well known. Typically, known inspection lamps comprise hooks or magnets to allow the lamps to be hung or positioned for ease of use in hands-free applications. However, such lamps are limited in illumination angle and may need to be repositioned in different locations to illuminate an area of interest. This can be time consuming and ineffective if there are limited suitable places for the lamp to be hung or positioned.

SUMMARY OF THE INVENTION

According to the invention there is provided a lamp as set out in claim 1.

The relative adjustability of the lamp housing and the lamp mounting may be restricted or prevented when the lamp housing and lamp mounting are brought together.

The lamp may be constructed to be portable. The lamp may be an inspection lamp.

The light source may comprise at least one LED light source in the lamp housing. The lamp housing may be adapted to contain a battery powering the light source.

The lamp mounting may comprise a permanent magnet.

The universal joint may comprise a ball and socket joint and may further comprise means restraining relative movement of the ball and socket joint. The restraining means may comprise an array of projections on one of the parts comprising the ball and socket joint and a corresponding array of depressions on the other of members comprising the ball and socket joint and in which the projections are arranged to fit.

The ball part of the ball and socket joint may be coupled to a shaft. The shaft may be mounted in the lamp housing, the arrangement being such that the ball part can be moved axially from a first position in which the lamp housing and the mounting lie closely adjacent to one another to a second position in which the lamp housing and mounting are spaced apart, the second position permitting articulation of the ball and socket joint. There may be detent means coupled between the lamp housing and the shaft to tend to retain the shaft in the first and second positions.

In another embodiment, the ball and socket joint may be axially movable in the lamp mounting. Means, e.g. a friction pad, may be provided for restraining such axial movement.

BRIEF DESCRIPTION OF THE DRAWINGS

The invention is diagrammatically illustrated, by way of example, in the accompanying drawings, in which.

In the drawings, the following reference numerals are used:
4=circuit board
5=reflector
6=battery
7=cross pin
8=bore
9=slot
10=lamp
12=lamp housing
12a, 12b=components of 12
14=mounting
16=LED array (side, inspection lamp)
18=LED array (end, torch)
20=power switch
22=shaft
24=ball
26=socket
28=magnet
30=grooves in 22
31=recesses
32=spring-loaded ball detent
33=spring
34=dimples on 24
35=ball
36=socket surface protrusions
38=shaft cavity
40=frictional ball surface
42=frictional socket surface
44=fixing block
46=through bore
48=socket member
50=cylindrical bore
52=cylindrical member
54=friction pad
56=spring
58=screw plug
60=screw thread
62=friction pad
64=hook 66=magnet
68=cut-out

DETAILED DESCRIPTION OF THE DRAWINGS

FIGS. 1a to 1d show a cordless inspection lamp 10 according to the present invention constructed both as a hand-held torch and as a static lamp intended to be mounted to a suitable surface. The lamp comprises a lamp housing 12, a mounting 14 and articulating or hinge means, described below, between the lamp housing and the mounting and connecting the housing and mounting together. In this embodiment, the lamp 10 has a generally rectangular form and the width of the lamp housing 12 matches the width of the mounting 14. The lamp housing 12 comprises light sources in two locations, namely a light source 16 on a side of the housing and a light source 18 on an end of the housing.

The lamp has two modes. Firstly, a user can grip the housing 10 and use it as a hand-held torch, in which case the light source 18 at the end of the lamp housing 12 provides illumination. Secondly, the lamp 10 can be used as a fixed or static light source and here, the light source 16 on the side of the lamp portion 12 can provide illumination. The light sources 16, 18 may each comprise an LED array powered by a battery mounted in the housing or via a mains power supply. The lighting modes can be switched by depressing the power button 20, which also functions to switch the lighting device on and off. For example, pressing the button once may turn on the device in one mode, pressing again may switch the device to another mode and pressing a third time may turn the device off.

Figure 1A:
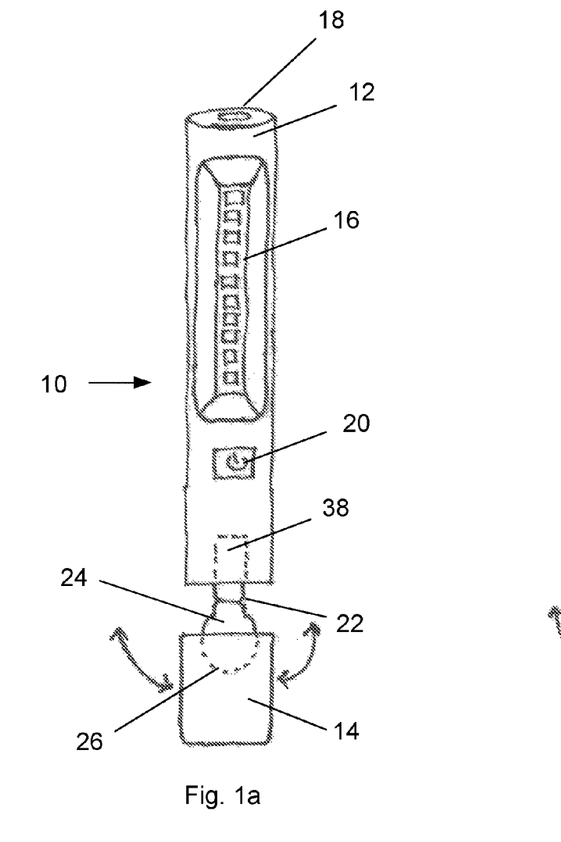
FIGS. 1a and 1b show a front end and side view respectively of a cordless inspection lamp according to an embodiment of the invention.
Figure 1B:
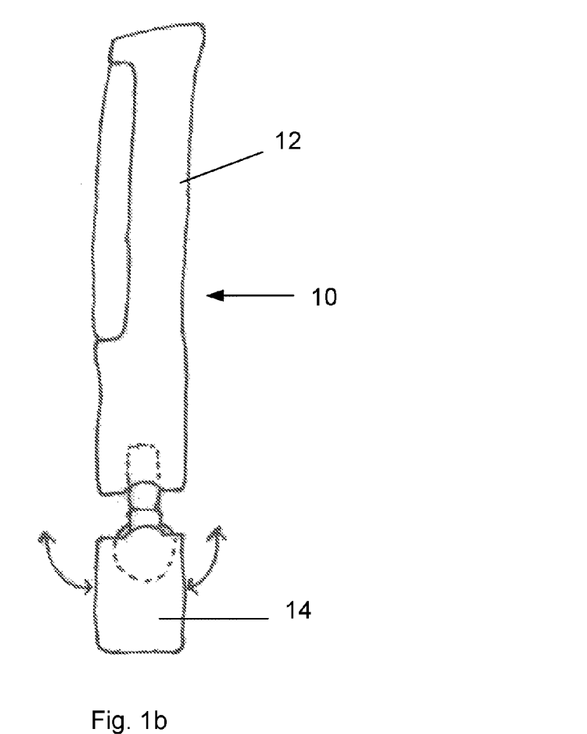

In the hand-held torch mode, the mounting 14 of the lighting device 10 is disposed in contact with the lamp housing 12, such that the mounting and lamp housing together form a handle for the user to grip the torch. The mounting 14 is brought into contact with the lamp portion 12 by the connecting means. The connecting means is formed as a universal joint in the form of a ball joint which allows a wide range of articulation of the lamp housing relative to the base in order to permit light to be directed at any desired angle. The ball joint comprises a ball 24 fixed to the end of a shaft 22, the shaft being snugly received and supported in a corresponding shaft cavity or bore 38 formed in an end of the lamp housing 12. The mounting is formed with a socket 26 in which the ball 24 is snugly received. The shaft 22 is arranged to be axially slidable in the bore 38 whereby the mounting and the housing can be moved into and out of contact depending on the mode of use. In FIGS. 1a and 1b, the lamp 10 is shown with the ball joint in the extended position, in which full articulation of the universal joint is possible.

In the fixed light source mode, the mounting 14 can be either in contact with the lamp portion 12 or can be positioned further away by pulling the shaft 22 partially out of the housing.

Figure 1C:
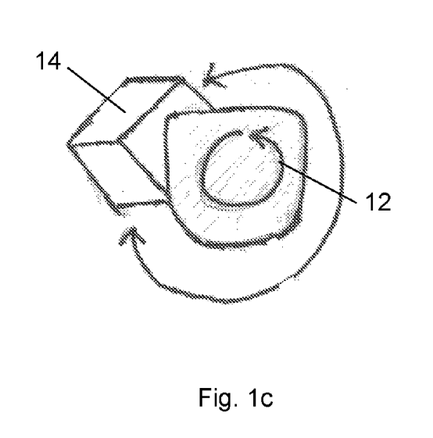
FIGS. 1c and 1d show a front end and enlarged partial side view respectively of the lamp of FIGS. 1a and 1b.
Figure 1D:
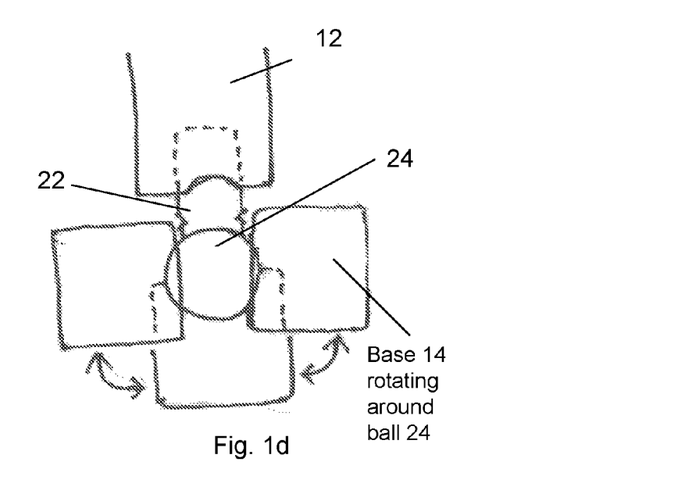

FIG. 1c shows a plan view of the rotating and pivoting motion of the lamp housing 12 relative to the mounting. FIG. 1d shows the mounting 14 in different positions relative to lamp housing 12 to allow light to be directed as desired.

Figure 2:
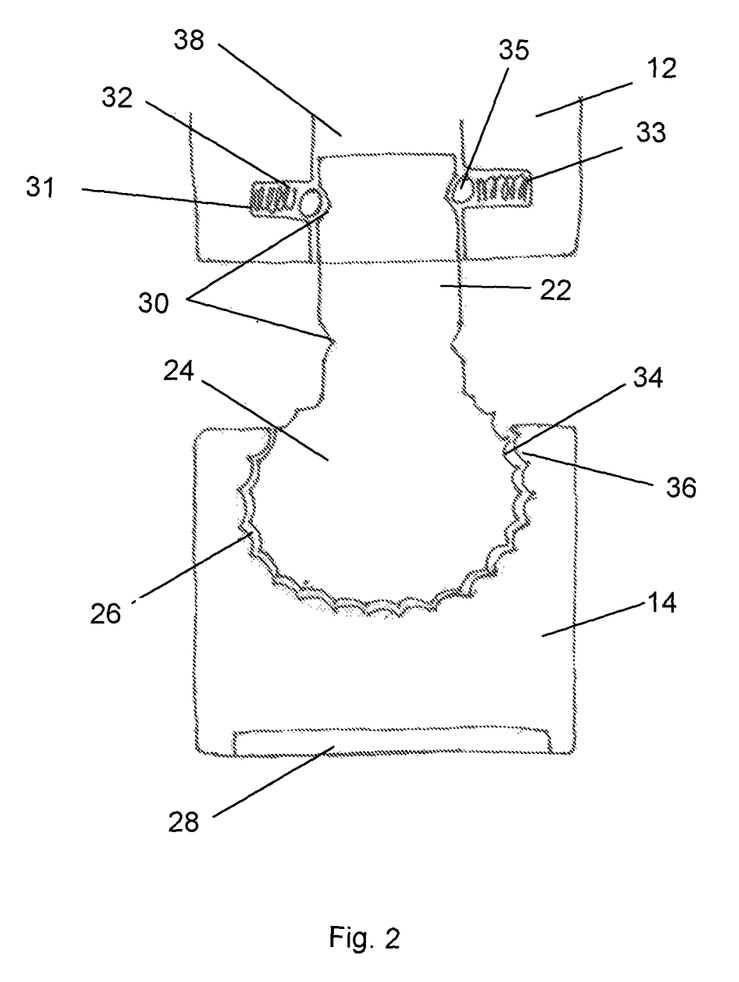
FIG. 2 is an enlarged partial cross-sectional side view of part of the lamp of FIGS. 1a and 1b.

FIG. 2 shows the universal ball joint mechanism in more detail. The mounting 14 contains a permanent magnet 28, which enables the lamp 10 to be magnetically attached to the surface of any ferromagnetic material. This allows the lamp to be securely and statically positioned, which may be particularly useful when the device is used in the fixed light source mode. The shaft 22 of the ball joint comprises an axially spaced pair of circumferential grooves or notches 30 forming part of a detent mechanism 32 which allows the extension shaft to be secured into first and second positions in the housing 12 with the cooperation of compression springs 33 which urge balls 35 to engage in the notches 30. The spring-loaded ball mechanisms 32 are located in recesses 31 within the lamp housing 12. On applying an axial force to either extend or retract the shaft 22 from the housing, the shaft is able to move within the shaft cavity 38 until the detent mechanisms latch the shaft into in either first or second position, in one of which the mounting is positioned closely adjacent to the housing and in the second of which the mounting and the lamp housing are spaced apart to allow the universal ball joint to articulate.

In this embodiment of the invention, the surface of the ball 24 of the ball joint is formed with a plurality of dimples 34 and the surface of the socket 26 is formed with a plurality of corresponding resilient protrusions 36, the dimples and protrusions intermeshing to resist free rotation of the ball and socket while allowing the ball to move with respect to the socket when a sufficient force is applied to overcome the resilient intermeshing so that the attitude of the mounting with respect to the housing can be adjusted as desired.

Figure 3:
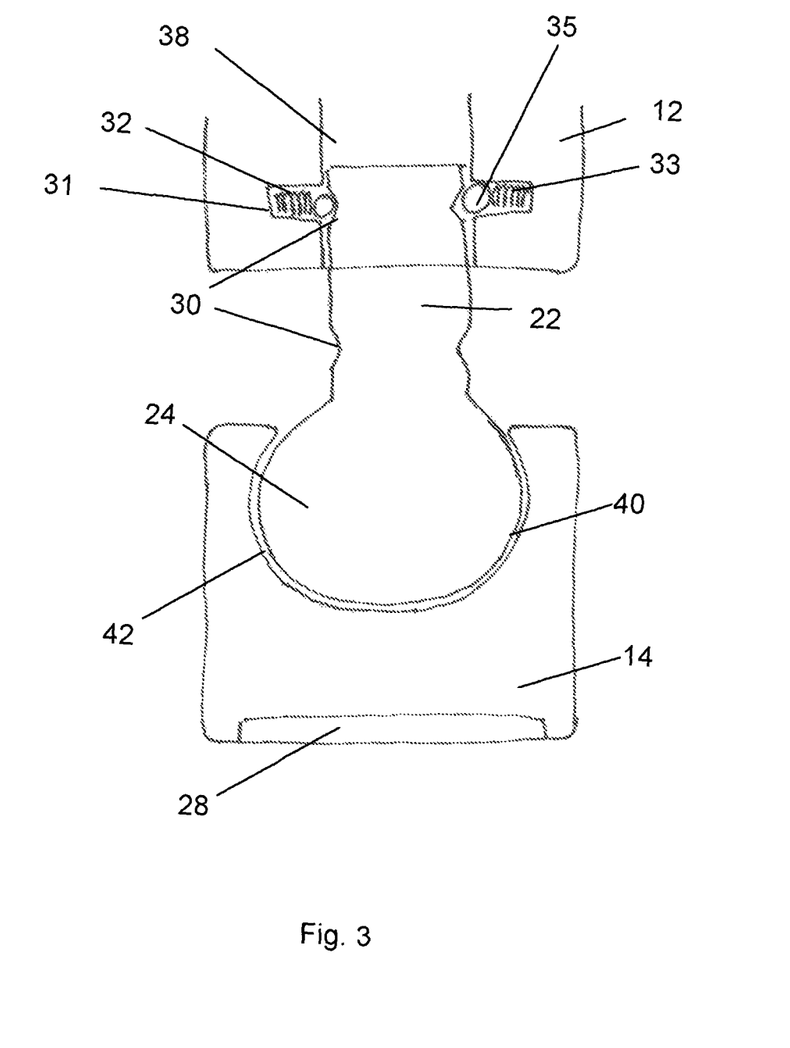
FIG. 3 is an enlarged partial cross-sectional side view corresponding to that of FIG. 2 and showing an alternative embodiment of the invention.

In another embodiment of the invention, the surface of the ball 24 and the surface of the socket 26 may be free of dimples and protrusions. FIG. 3 shows spherical ball surface 40 and socket surface 42. In such an arrangement frictional means (not shown) may be used to resist free movement of the ball relative to the socket. Thus the ball may be a tight fit in the socket or an adjustable friction device may be employed.

With reference to FIGS. 4 to 14 of the drawings there is shown an embodiment of portable inspection lamp that is generally similar to what has been described above both in terms of construction and operation. The same reference numerals have been used in the embodiment of FIGS. 4 to 14 to designate parts that are in common with the previous embodiments, and the following description is directed primarily at constructional features that differ from the previous embodiments.

These constructional differences are essentially confined to the mounting 14, where the ball 24 and socket 26 is arranged to move axially in the mounting 14 to move the mounting between extended and retracted positions relative to the lamp housing 12, instead of the shaft or stem 22 sliding to and fro between retracted and extended positions in the lamp housing 12 for the same purpose as in the embodiment of FIGS. 1 to 3.

Figure 4:
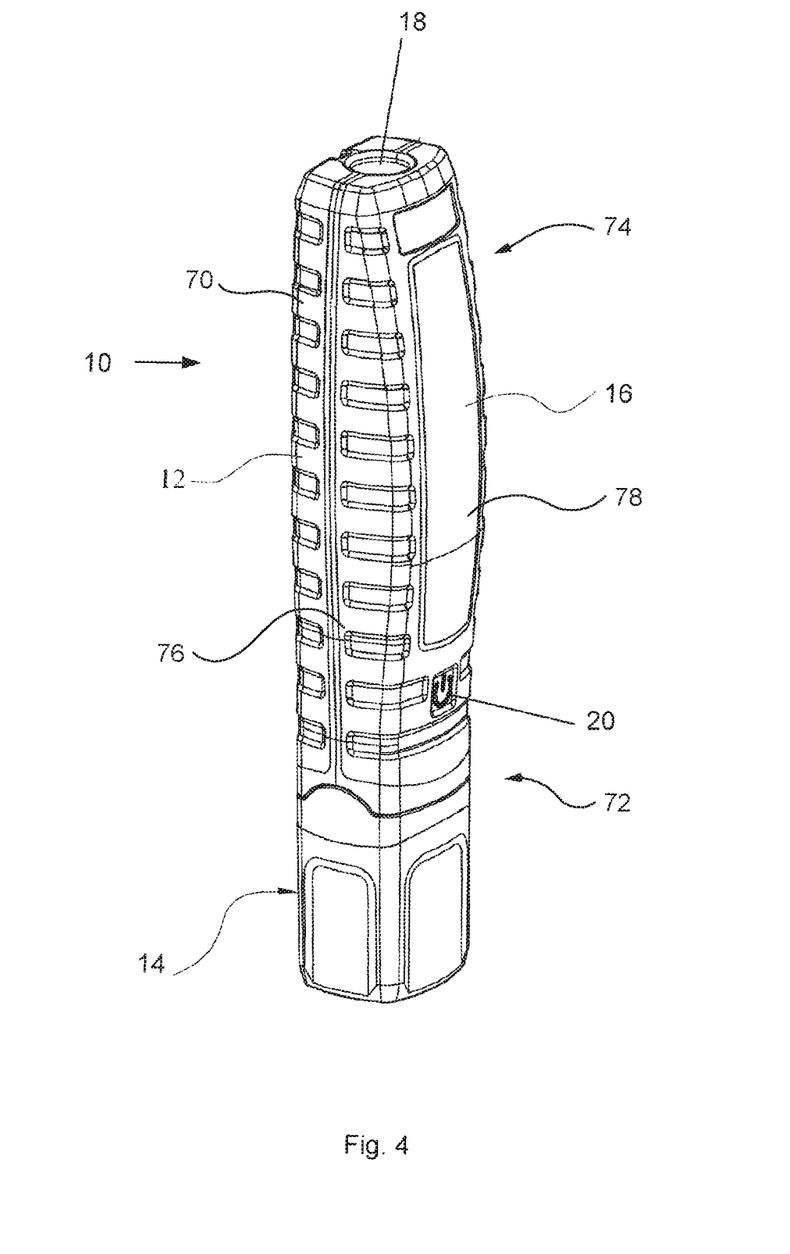
FIG. 4 is a perspective view of another embodiment of the inspection lamp invention.
Figure 5:
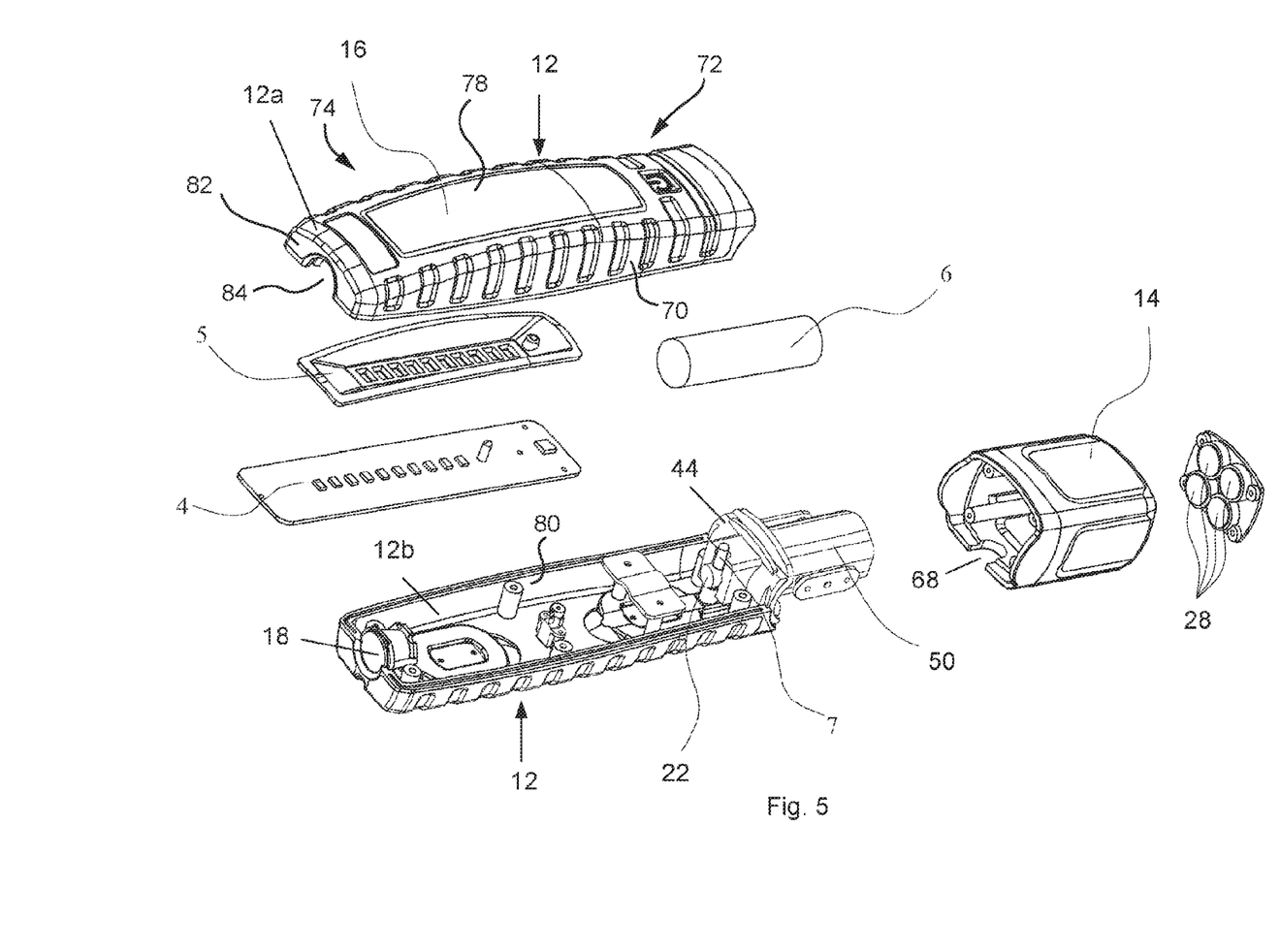
FIG. 5 is an exploded perspective view of the lamp of FIG. 4.

FIGS. 4 to 14 show a further embodiment of cordless inspection lamp 10 according to the present invention constructed both as a hand-held torch and as a static lamp intended to be mounted to a suitable surface. The lamp comprises a lamp housing 12, a lamp mounting 14 and articulating or hinge means, described below, between the lamp housing and the mounting and connecting the housing and mounting together. The lamp housing 12 comprises a body 70 having a first end 72, an opposing second end 74, and a side surface 76 extending therebetween. A window 78 is disposed on side surface 76 of body 70. Lamp housing 12 at least partially bounds a compartment 80 (FIG. 5). Light sources are in two locations, namely a light source 16 on a side of the housing and a light source 18 on the end of the housing which is opposite to the lamp mounting.

The lamp has two modes. Firstly, a user can grip the housing 10 and use it as a hand-held torch, in which case light source 18 at the end of the lamp housing 12 provides illumination. Secondly, the lamp 10 can be used as a fixed or static light source and here, the light source 16 on the side of the lamp portion 12 can provide illumination. The light sources 16, 18 may each comprise a light-emitting diode or LED array powered by a battery 6 mounted in the housing. It will be appreciated however that the lamp could be powered from a mains power supply if desired. The lighting modes can be switched by depressing the power button 20 on the side of the housing 12, which also functions to switch the lighting device on and off. For example, the button 20 may operate as a toggle switch so that pressing the button once may turn on the device in one mode, pressing again may switch the device to another mode and pressing a third time may turn the device off.

Figure 8:
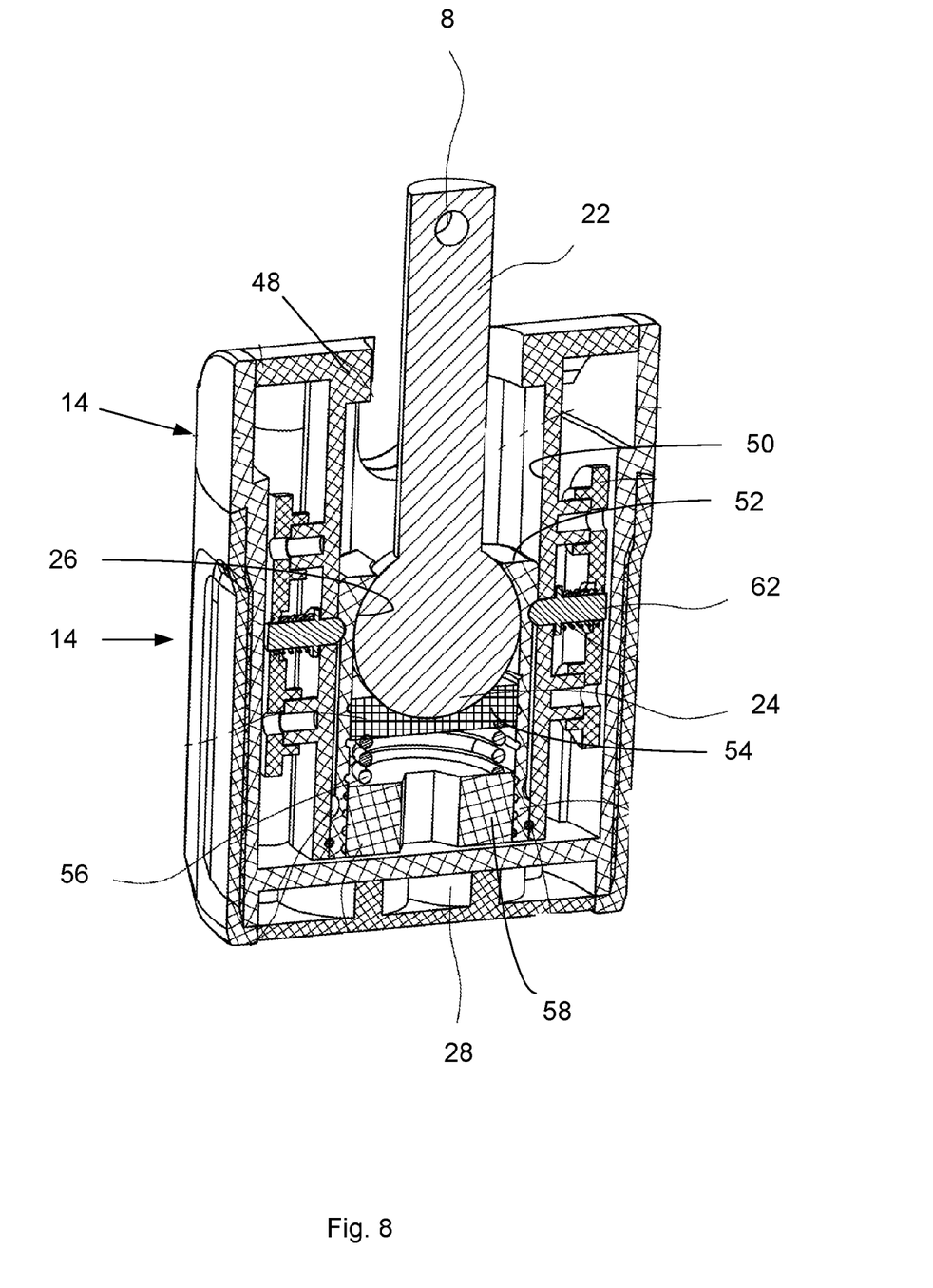
FIG. 8 is a cross-sectional view of the mounting of the lamp of FIG. 4.
Figure 9:
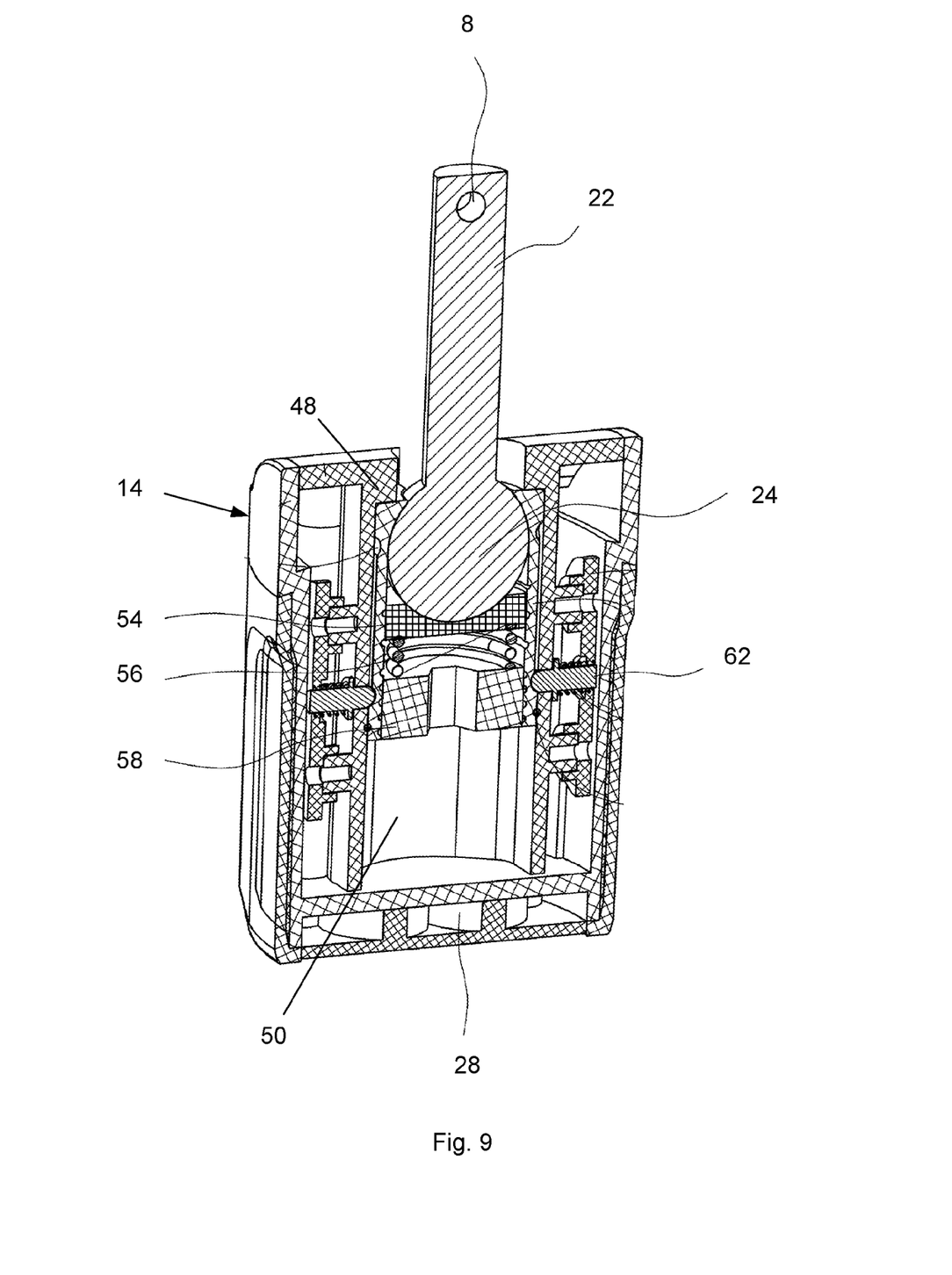
FIG. 9 is a cross-sectional view similar to that of FIG. 8 in a different operative position.
Figure 10:
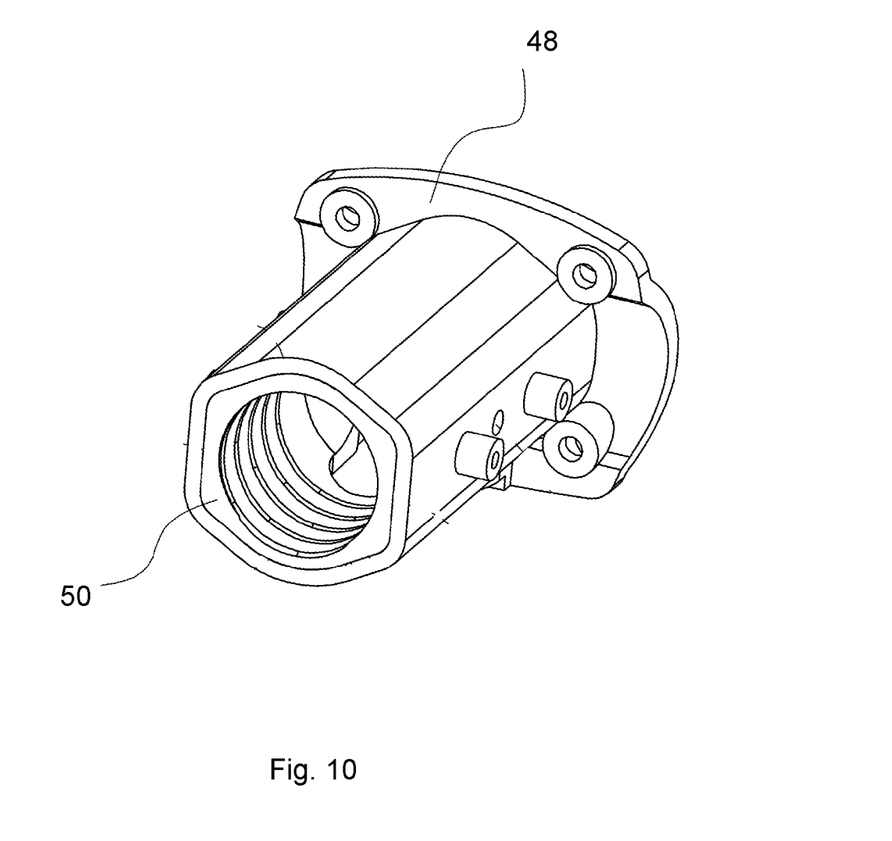
FIG. 10 is a perspective view of an internal part of the mounting.
Figure 11:
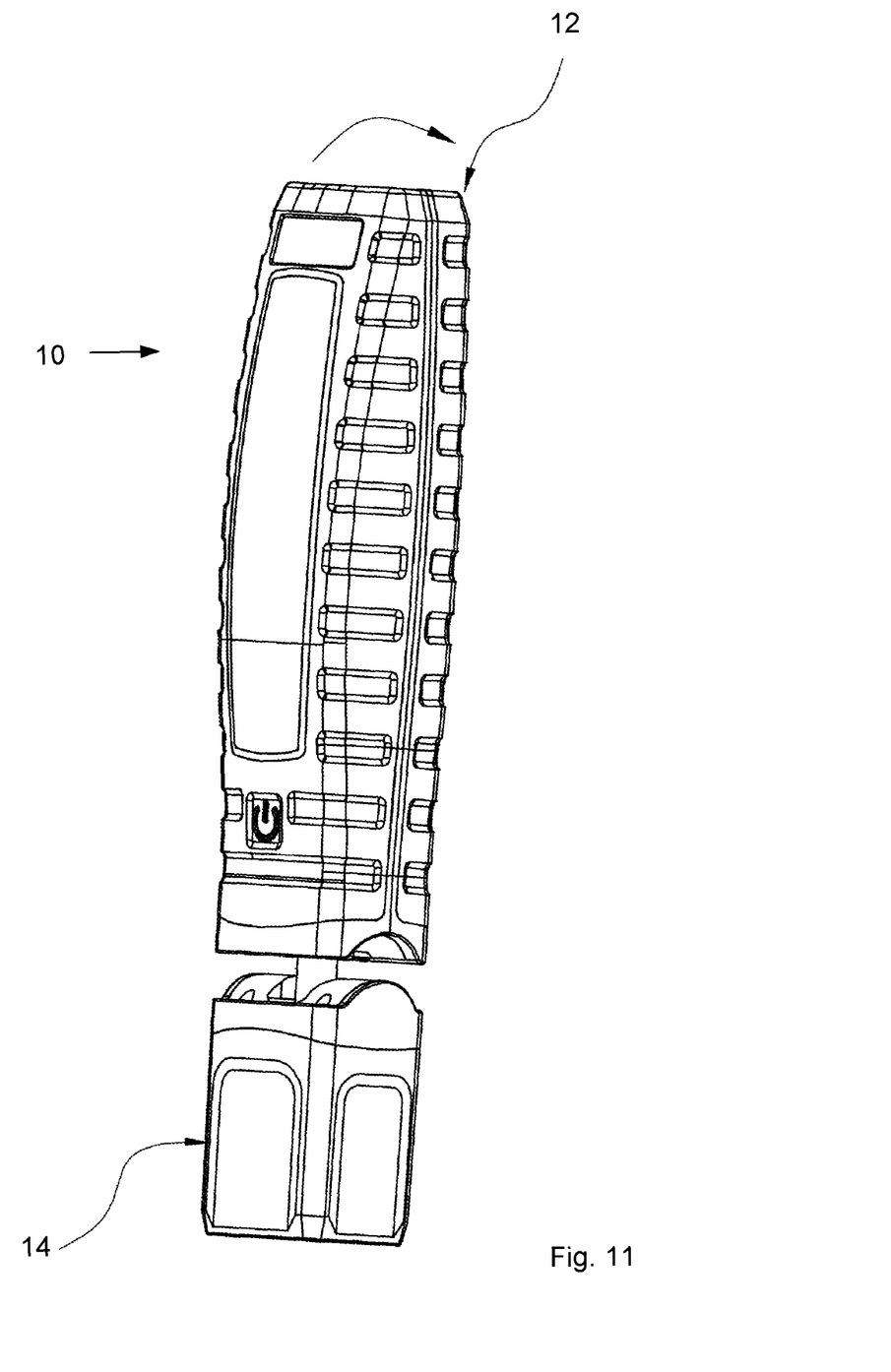
FIG. 11 is a perspective view of the lamp of FIG. 4 in a different operative position.
Figure 12:
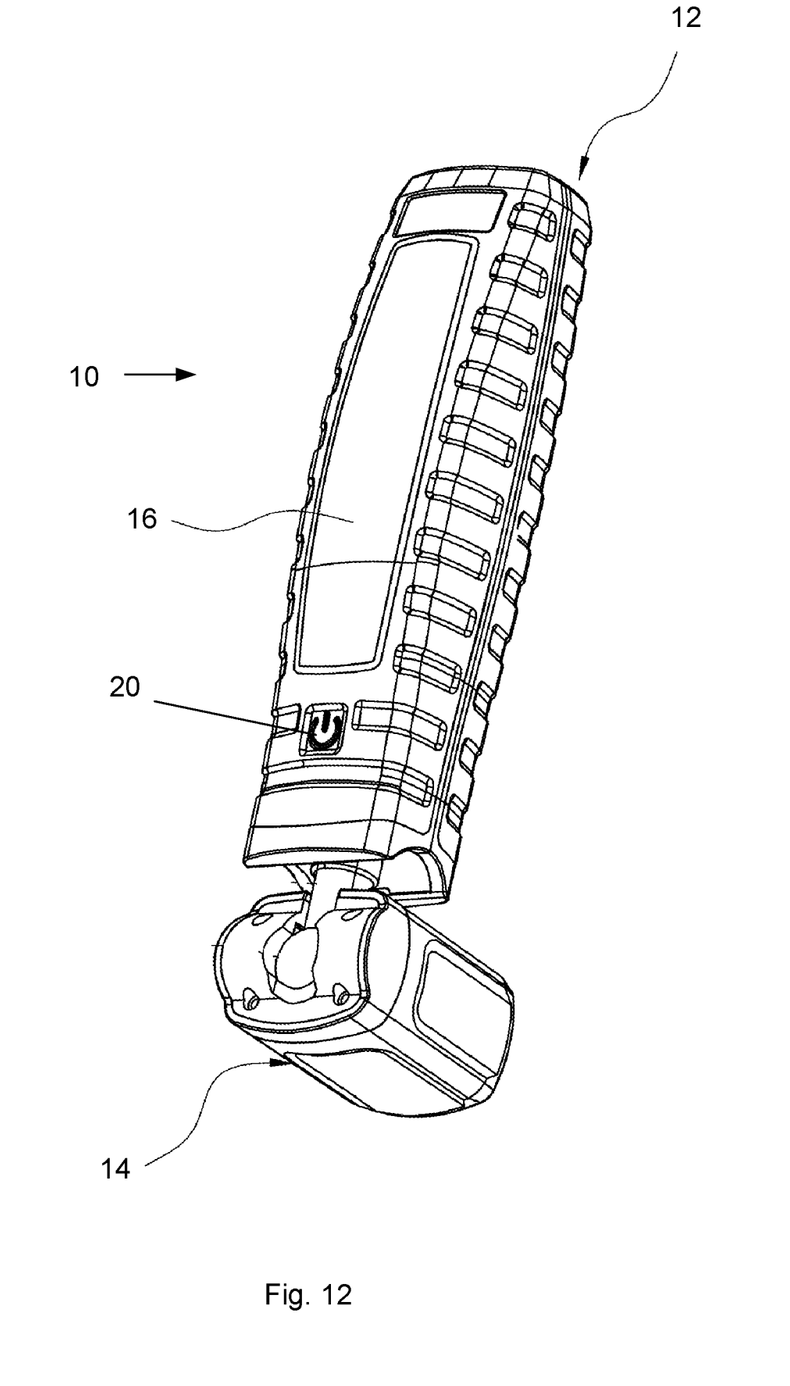
FIG. 12 is a perspective view of the lamp of FIG. 4 in a further operative position.
Figure 13:
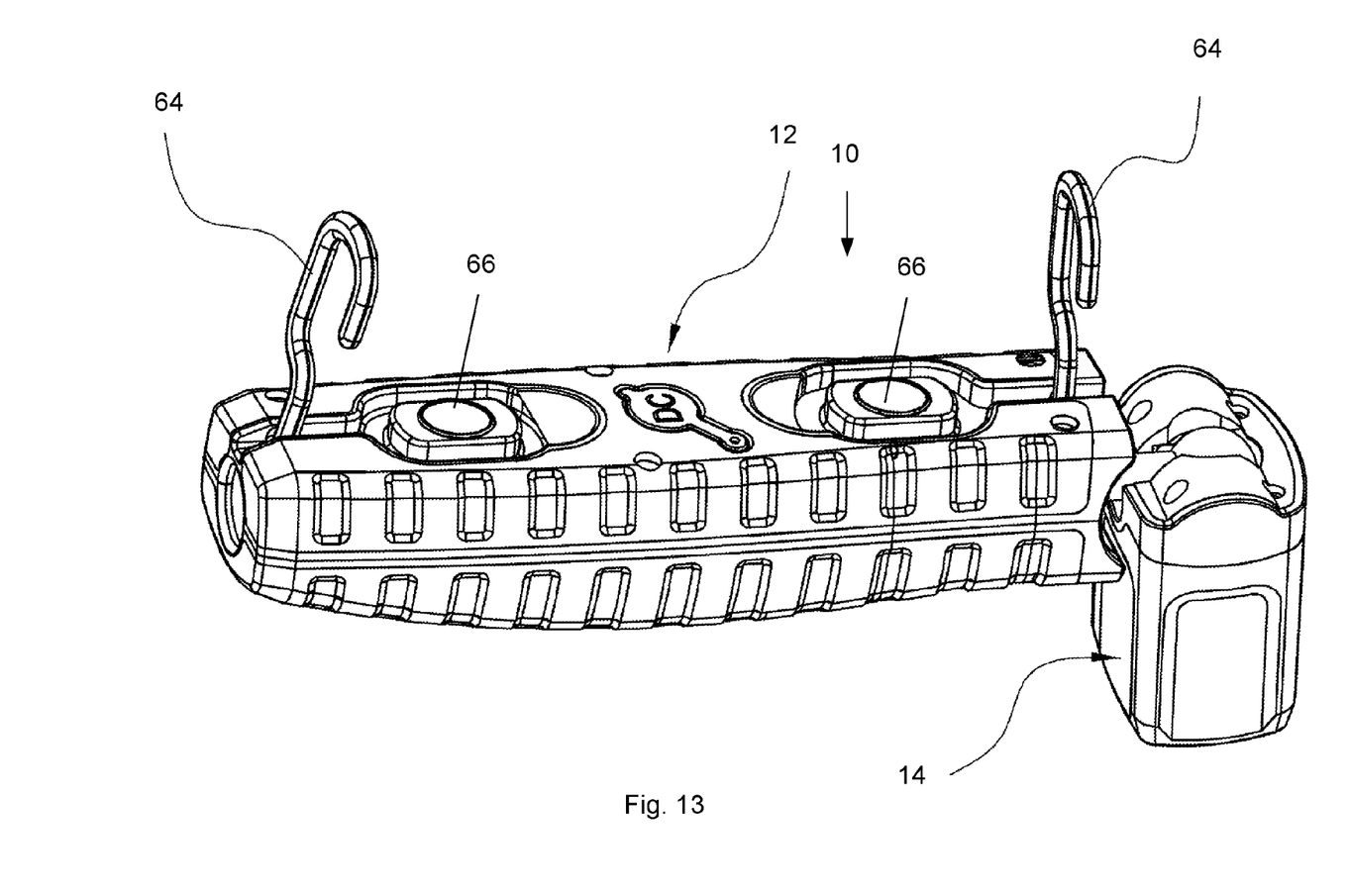
FIG. 13 is a perspective view of the lamp of FIG. 4 in a yet further operative position.
Figure 14:
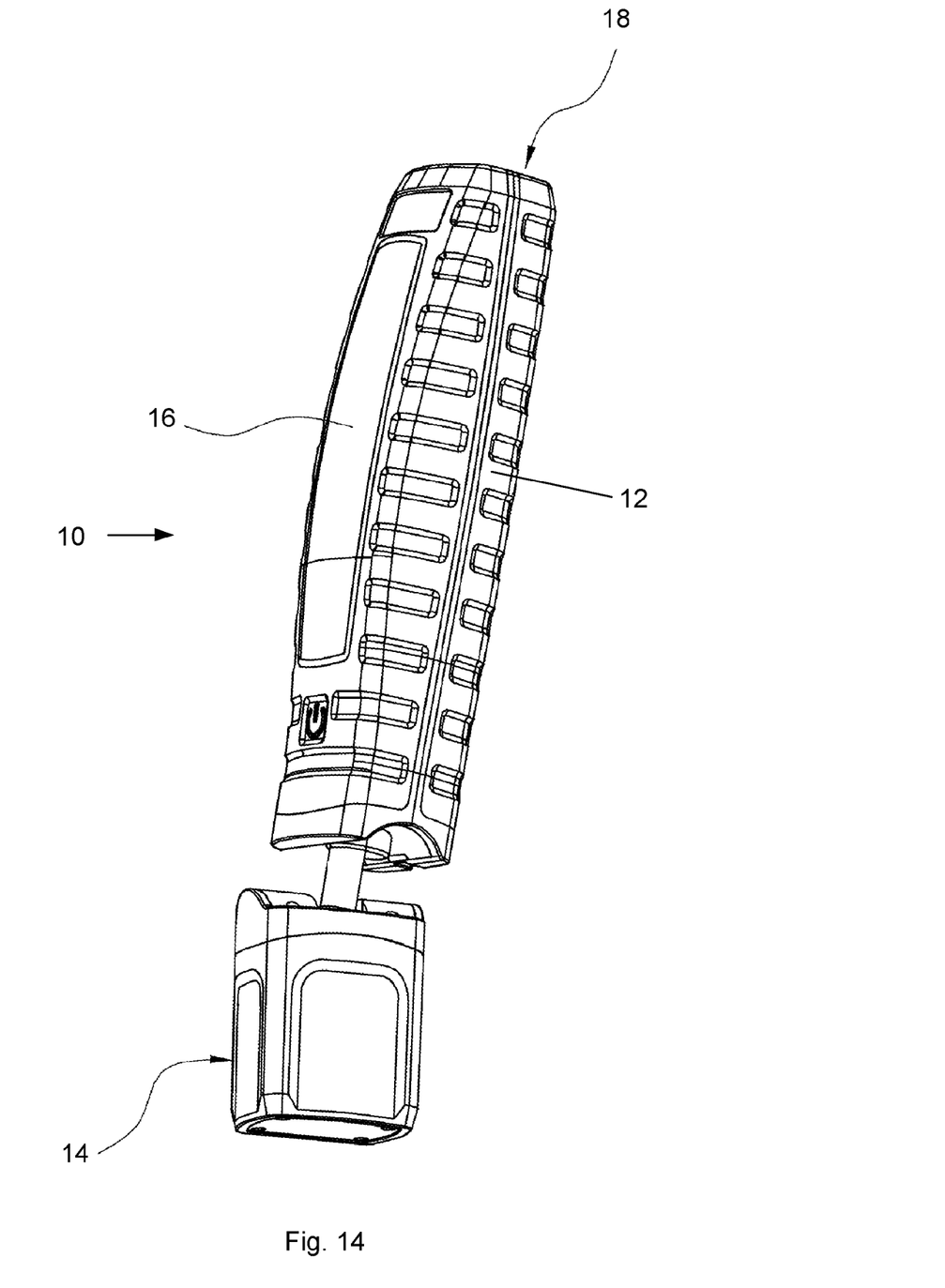
FIG. 14 is a perspective view of the lamp of FIG. 4 in a still further operative position.

In the hand-held torch mode, the mounting 14 of the lighting device 10 is disposed in contact with the lamp housing 12, such that the mounting and lamp housing together form a handle for the user to grip the torch. The mounting 14 is brought into contact with the lamp portion 12 by a connecting means. The connecting means is formed as a universal joint in the form of a ball joint that allows a wide range of articulation of the lamp housing relative to the mounting in order to permit light to be directed at a desired angle. The ball joint comprises a ball 24 fixed to the end of a stem or shaft 22, the shaft being fixed in an end of the lamp housing 12 by means of a cross pin 7, as describes in more detail below. The mounting is formed with a socket 26 in which the ball 24 is snugly received. The ball and socket is arranged to be axially slidable in the mounting as best shown in FIGS. 8 and 9 whereby the mounting and the housing can be moved into and out of contact depending on the mode of use. In FIG. 4 the lamp 10 is shown with the ball joint in its retracted position whereas in FIG. 11 the housing and mounting are shown in the extended position, in which full articulation of the universal joint is possible, as shown in FIGS. 12 to 14. Full articulation is aided by a generally U-shaped cut out portion 68 formed in the mounting 14, as seen in FIG. 5, and which received the stem 22 during such full articulation.

Figure 6:
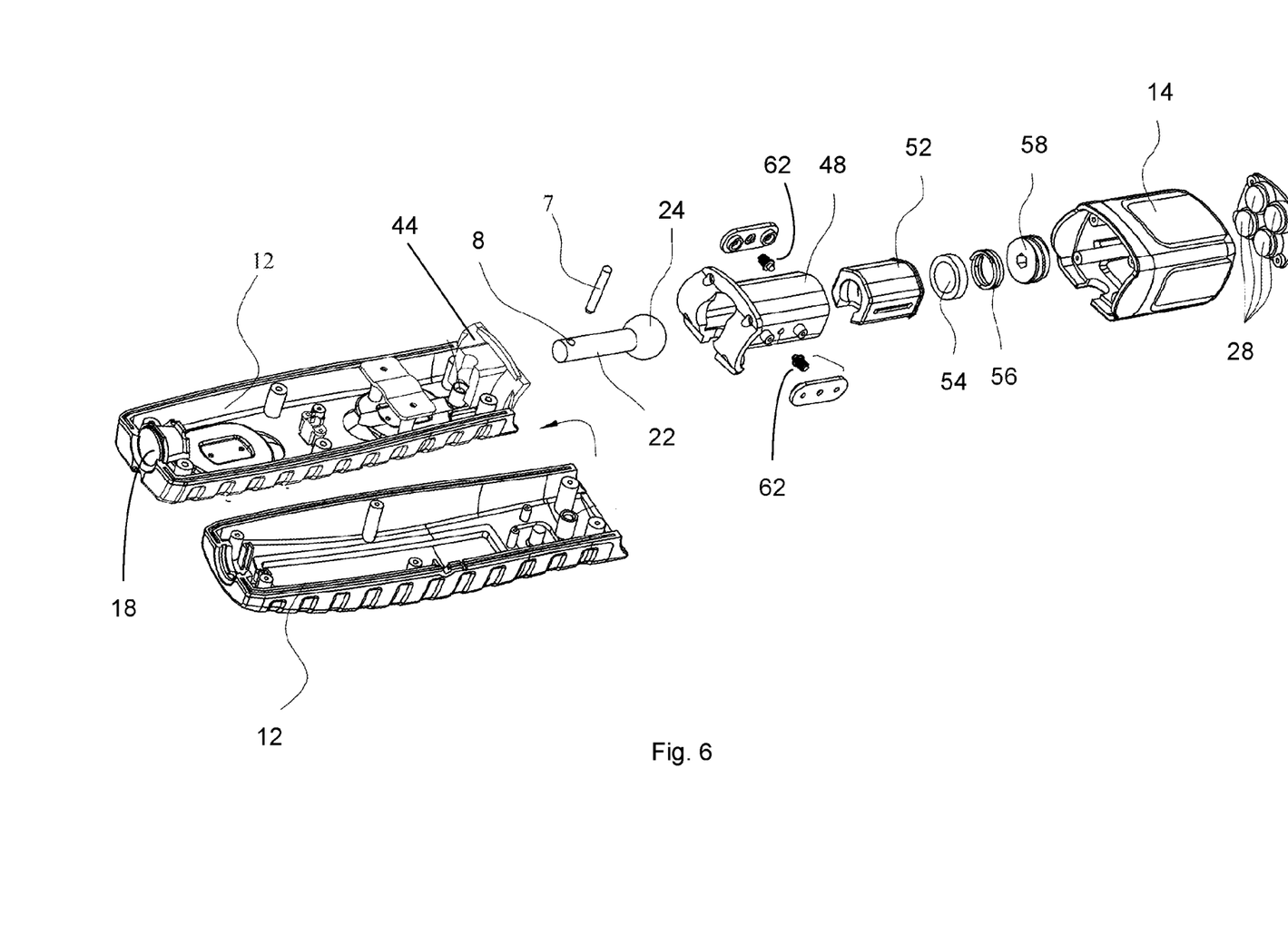
FIG. 6 is a further exploded perspective view of the lamp of FIG. 4, taken from a different angle.
Figure 7:
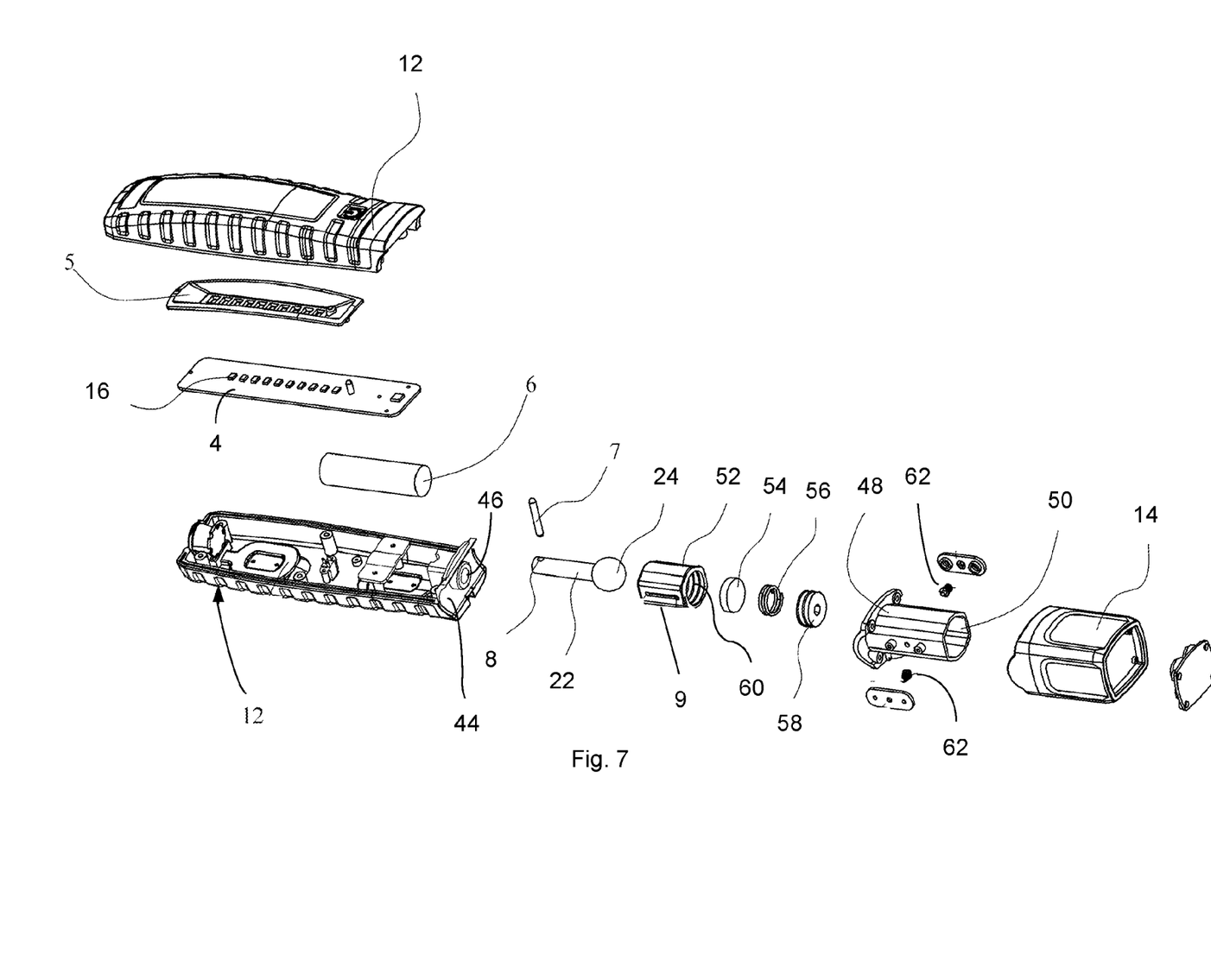
FIG. 7 is a yet further exploded perspective view of the lamp of FIG. 4.

In the exploded views of FIGS. 5,6 and 7, it can be seen that the lamp housing 12 comprises a pair of similar housing components 12a and 12b, which may be plastics mouldings, and which fit together to form the housing 12. Fixings, such as screws, not shown, may be used to fasten the components 12a and 12b together in conventional fashion. The housing 12 contains a circuit board 4 for an array of LED lamps, a light reflector 5 for the lamp array, and a dry-cell battery 6. Second end 74 of body 70 of lamp housing 12 terminates at a terminal end face 82 having an opening 84 extending therethrough, light sources 18 is disposed within compartment 80 of lamp housing 12 so as to be visible through opening 84.

The ball and socket mechanism as shown in FIGS. 5 to 9 comprises a fixing block 44 clamped in an end of the lamp housing 12 and having a through bore 46 that receives the shaft 22. The stem or shaft 22 is formed with a cross bore 8 adjacent to its free end and which receives the pin 7 to prevent detachment of the shaft from the fixing block 44 and to restrain the shaft 22 from movement either longitudinally or rotationally relative to the fixing block 44 and the housing 12. The ball 24 on the other end of the shaft 22 is mounted in a socket member 48 which is fixed in the lamp mounting 14, e.g. with the aid of fastenings, not shown. The socket member 48 is formed internally with a cylindrical bore 50 in which a generally cylindrical member 52 is snugly received, the arrangement being such that the member 52 can slide longitudinally along the bore 50, the movement of the member 52 being restrained by frictional contact between the member 52 and the bore 50. As shown, the frictional contact may be adjustable with the aid of friction pads 62 fixed to the sides of the member 48 and contacting slots 9 in the side of the member 52. The ball 24 is received in a socket 26 formed in the member 52 and friction is applied to the ball 24 to restrain its movement by means of a friction pad 54 and spring 56 which are retained in the member 52 by means of a screw-threaded plug 58 received in a correspondingly screw thread 60 in the member 52.

The mounting 14 has an array of permanent magnet 28 fixed in its end face, which enables the lamp 10 to be magnetically attached to any ferromagnetic surface. This allows the lamp to be securely and statically positioned, which may be particularly useful when the device is used, for example as an automobile inspection lamp. Additional magnets can be provided on a side of the lamp housing 12, as shown at 66 in FIG. 13 and, as illustrated in the same Figure, the lamp housing can be formed with retractable hooks 64 to provide an additional means of supporting the lamp in a desired static position.

No doubt many other effective alternatives will occur to the skilled person. Thus the ball joint could be replaced by another universal joint, e.g. a Hooke's joint. It will be understood that the invention is not limited to the described embodiments and encompasses modifications apparent to those skilled in the art lying within the spirit and scope of the claims appended hereto.

The invention claimed is:

1. A lamp constructed as a hand lamp and for static use, the lamp comprising:
   a lamp housing comprising a body having a first end, an opposing second end, and a side surface extending therebetween and a window disposed on the side surface of the body, the lamp housing at least partially bounding a compartment,
   at least one light source disposed in the compartment of the lamp housing behind the window,
   a lamp mounting for mounting the lamp in a desired position on a surface, and
   a universal joint coupling the lamp housing and the lamp mounting together,
   which universal joint in use provides both a rotational movement and a pivoting movement of the lamp housing relative to the lamp mounting,
   wherein the universal joint comprises a ball and socket joint,
   wherein the ball part of the ball and socket joint is coupled to a shaft, which shaft is mounted in the lamp housing, the arrangement being such that the ball part can be moved axially from a first position in which the lamp housing and the mounting lie closely adjacent to one-another to a second position in which the lamp housing and mounting are spaced apart, the second position permitting articulation of the ball and socket joint,
   the lamp further comprising a detent coupled between the lamp housing and the shaft to tend to retain the shaft in the first and second positions.

2. The lamp according to claim 1, wherein the relative adjustability of the lamp housing and lamp mounting is restricted or prevented when the lamp housing and lamp mounting are brought together.

3. The lamp according to claim 1, wherein the lamp is constructed to be portable.

4. The lamp according to claim 1, wherein the lamp is an inspection lamp.

5. The lamp according to claim 1, wherein the at least one light source comprises an LED light source.

6. The lamp according to claim 1, wherein the lamp housing is adapted to contain a battery powering the light source.

7. The lamp according to claim 1, wherein the lamp mounting comprises a permanent magnet.

8. The lamp according to claim 1, wherein relative movement of the ball and socket joint is restrained by a restraining means comprising an array of projections on one of the parts comprising the ball and socket joint and a corresponding array of depressions on the other members comprising the ball and socket joint and in which the projections are arranged to fit.

9. The lamp according to claim 1, wherein the universal joint is axially movably mounted in the lamp mounting.

10. The lamp according to claim 9, comprising a friction pad for restraining axial movement of the ball and socket joint in the lamp mounting.

11. The lamp according to claim 7, wherein the universal joint is axially movably mounted in the lamp mounting.

12. The lamp according to claim 1, wherein the universal joint is coupled to the first end of the body of the lamp housing.

13. The lamp according to claim 12, wherein the second end of the body of the lamp housing terminates at a terminal end face having an opening extending therethrough, a second light source that is separate from the at least one light source being disposed within the compartment of the lamp housing so as to be visible through the opening.

* * * * *